(12) United States Patent
Wayne et al.

(10) Patent No.: US 9,129,369 B1
(45) Date of Patent: Sep. 8, 2015

(54) METHOD FOR CHARACTERIZING AN ATMOSPHERIC CHANNEL

(71) Applicants: David Thomas Wayne, San Diego, CA (US); Colin Norris Reinhardt, Santee, CA (US)

(72) Inventors: David Thomas Wayne, San Diego, CA (US); Colin Norris Reinhardt, Santee, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 14/267,127

(22) Filed: May 1, 2014

(51) Int. Cl.
*G06K 9/40* (2006.01)
*G06T 5/00* (2006.01)
*G06T 7/00* (2006.01)
*G06T 7/20* (2006.01)

(52) U.S. Cl.
CPC .............. *G06T 5/002* (2013.01); *G06T 5/003* (2013.01); *G06T 5/009* (2013.01); *G06T 7/0002* (2013.01); *G06T 7/2033* (2013.01); *G06T 2207/20048* (2013.01); *G06T 2207/20182* (2013.01); *G06T 2207/20201* (2013.01); *G06T 2207/30192* (2013.01)

(58) Field of Classification Search
USPC .......... 382/274, 260, 261, 131, 128; 250/234, 250/252.1, 338.1; 345/581, 617; 356/444; 374/E11.003; 436/63; 600/425
See application file for complete search history.

(56) References Cited

U.S. PATENT DOCUMENTS

| | | | | |
|---|---|---|---|---|
| 6,285,799 | B1 * | 9/2001 | Dance et al. | 382/261 |
| 7,811,825 | B2 * | 10/2010 | Fauver et al. | 436/63 |
| 8,199,162 | B2 * | 6/2012 | Bernhardt et al. | 345/581 |

OTHER PUBLICATIONS

Alexander V. Moshkov, Victor N. Pozhidaev, Alexander A. Semenov, Alessandro Barducci, Donatella Guzzi, Vanni Nardino, Ivan Pippi; Atmospheric Optical Depth Retrieval from Multiangle Chris Images; International Journal of Remote Sensing Applications vol. 3 Issue 3, Sep. 2013.
Colin N. Reinhardt, D.Wayne, K. McBryde, G. Cauble; Extracting Atmospheric Turbulence and Aerosol Characteristics from Passive Imagery; Proc. SPIE 8874, Laser Communication and Propagation through the Atmosphere and Oceans II, 88740F, Sep. 25, 2013.

* cited by examiner

*Primary Examiner* — Anh Do
(74) *Attorney, Agent, or Firm* — SPAWAR Systems Center Pacific; Kyle Eppele; J. Eric Anderson (57) ABSTRACT

A method for characterizing an atmospheric propagation channel comprising: generating a database of atmospheric modulation transfer functions (MTFs) over a range of known values for at least one image-quality-related parameter; capturing at least one image of an object with an image capture device, wherein the image capture device is separated from the object by the atmospheric channel; deconvolving the captured image with every atmospheric MTF in the database to create a plurality of deconvolved, captured images; scoring each deconvolved, captured image according to an image quality metric (IQM); using an optimization-decision algorithm to find the best IQM score; and characterizing the atmospheric propagation channel as possessing the type and value of the image-quality-related parameters that are associated with the corresponding MTFs used to deconvolve the image having the best IQM score.

20 Claims, 9 Drawing Sheets

METHOD FOR CHARACTERIZING AN ATMOSPHERIC CHANNEL

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102604.

BACKGROUND OF THE INVENTION

The performance of an electro-optical system is limited by the conditions of the atmospheric channel in which it must operate. Typically, measurements of the channel are made using a cooperative double-ended approach, that is, a transmitter is positioned at one location and the data is transmitted through the channel and received at another physically-remote location. There are many methods available to characterize and measure the parameters of an atmospheric optical channel. Most of the aforementioned methods involve a laser transmitter pointing at a receiver probing the channel of interest between the two endpoints. In a situation where an atmospheric channel measurement needs to be taken without prior planning, a cooperative transmitter is generally not available.

SUMMARY

Disclosed herein is a method for characterizing an atmospheric propagation channel comprising the following steps. The first step provides for generating a database of atmospheric modulation transfer functions (MTFs) over a range of known values for at least one image-quality-related parameter. The next step provides for capturing at least one image of an object with an image capture device that is separated from the object by the atmospheric channel. The next step provides for deconvolving the captured image with every atmospheric MTF in the database to create a plurality of deconvolved, captured images. The next step provides for scoring each deconvolved, captured image according to an image quality metric (IQM). The next step provides for using an optimization-decision algorithm to find the best IQM score. The next step provides for characterizing the atmospheric propagation channel as possessing the type and value of the image-quality-related parameters that are associated with the corresponding MTFs used to deconvolve the image having the best IQM score.

The invention claimed herein may also be described as a method for characterizing optical parameters of an atmospheric propagation channel comprising the following steps. First, generate a database comprising a plurality of atmospheric condition scenarios according to a model based on known values of at least one image-quality-related parameter. Second, passively capture a digital image of an object. The image is blurred and distorted due to atmospheric effects. Third, correct the image based on the atmospheric condition scenario in the database to produce a plurality of corrected images. Fourth, score each corrected image according to a no-reference, image quality metric and identifying the corrected image with the best score. Fifth, characterize the optical parameters of the atmospheric propagation channel as equal to the atmospheric condition scenario that corresponds to the best score.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
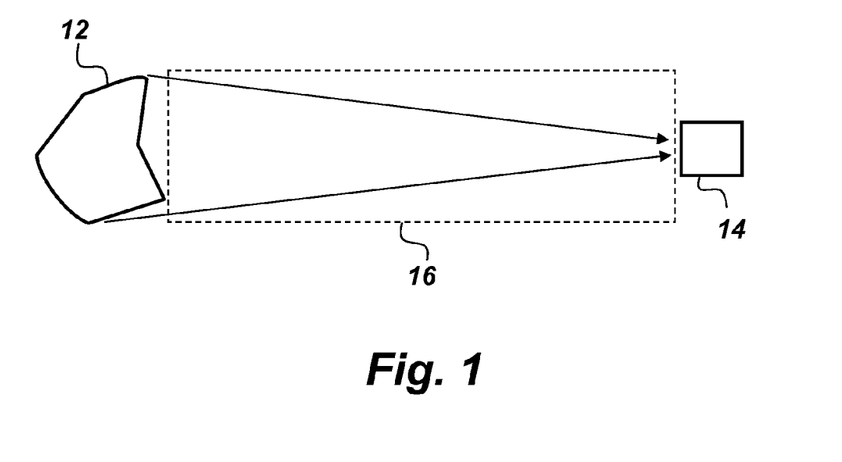
FIG. 1 is an illustration of an object separated from an image capture device by an atmospheric propagation channel.

FIG. 1 is an illustration of an object 12 separated from an image capture device 14 by an atmospheric propagation channel 16. Atmospheric channel characterization method 10 may be used to extract optical characterization parameters of the atmospheric propagation channel 16 using an image taken through the channel 16. The image capture device 14 may be any imaging system (e.g., telescope/lens and a camera) that may be used to digitally capture an image of the object 12. The object 12 may be any object with known or unknown characteristics that is separated from the image capture device by the atmospheric channel 16. The image of the object 12 will be blurred and distorted due to atmospheric effects such as turbulence and aerosol-induced attenuation and scattering. Then, according to the atmospheric channel characterization method 10, the captured image is processed against a database of images pre-distorted based upon a model. The processed ("restored") image is then assessed and scored with at least one image quality metric (IQM). Once the processed image with the best score is found, the corresponding model parameters used to pre-distort the image are assumed to best represent the true parameters of the atmospheric channel 16.

Figure 2:
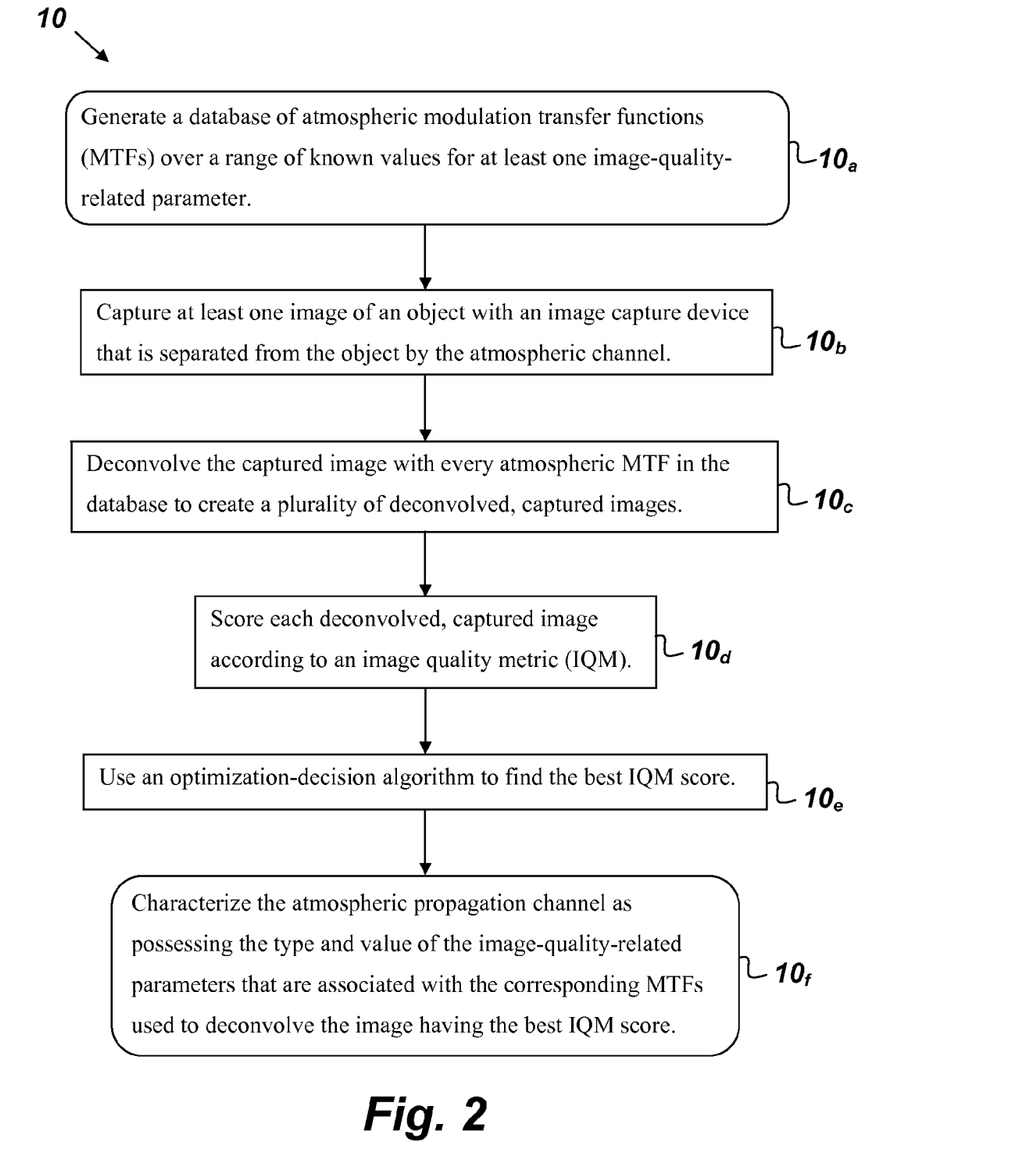
FIG. 2 is a flowchart of a method for characterizing an atmospheric propagation channel.

FIG. 2 is a flowchart of the method 10 for characterizing an atmospheric propagation channel that comprises, consists of, or consists essentially of the following steps $10_a$-$10_f$. The first step $10_a$ provides for generating a database of atmospheric modulation transfer functions (MTFs) over a range of known values for at least one image-quality-related parameter. The next step $10_b$ provides for capturing at least one image of an object with an image capture device that is separated from the object by the atmospheric channel. The next step $10_c$ provides for deconvolving the captured image with every atmospheric MTF in the database to create a plurality of deconvolved, captured images. The next step $10_d$ provides for scoring each deconvolved, captured image according to an image quality metric (IQM). The next step $10_e$ provides for using an optimization-decision algorithm to find the best IQM score. The next step $10_f$ provides for characterizing the atmospheric propagation channel as possessing the type and value of the image-quality-related parameters that are associated with the corresponding MTFs used to deconvolve the image having the best IQM score.

In addition to describing an image g(x, y) in terms of its spatial (x, y) pixel coordinate intensities, it is useful to represent an image in terms of its equivalent spatial frequency components, or in terms of the related spatial-angular frequency components, which are related to the spatial domain by the two-dimensional Fourier-transform operation.

$$G(\upsilon_{sx}, \upsilon_{sy}) = \int_{-\infty}^{\infty}\int_{-\infty}^{\infty} g(x, y)\exp[-j2\pi(\upsilon_{sx}x + \upsilon_{sy}y)]\,dx\,dy \quad (1)$$

The angular-spatial-frequency [cycles/radian] is defined by $\omega_s = f\nu_s$, where f is the lens focal length [mm] of the image capture device 14 and $\nu_s$ is the spatial frequency [cycles/mm]. These frequency-domain representations are fundamental to the MTF approach.

The MTF is the magnitude of the Fourier transform of the point spread function (PSF). For an aberration-free imaging system, the image quality is limited by the finite aperture of the imaging system. This has the effect of blurring or smearing the image in the image plane. The resulting image blur is inversely proportional to the aperture size; resulting in less blur for larger apertures. The MTF acts as a low-pass filter for spatial frequencies. This paradigm of image blur for a finite aperture may also be extended to model the effects of the atmospheric channel 16 on imaging. An image taken through the atmospheric channel 16 experiences blurring and distortion due to any number of atmospheric effects such as turbulence, absorption, and scattering along the channel 16. The turbulence effects can be modeled by treating the atmosphere as a low pass spatial filter with a MTF determined by Fried's parameter $r_0$. Fried's parameter represents a diameter effectively describing the limiting aperture size for image resolution in the presence of atmospheric turbulence. In other words, for an image capture device 14 with an aperture larger than $r_0$ will have no increased resolution due to the limiting effects of the atmospheric turbulence. Fried's parameter ranges from millimeters for very turbulent atmospheric channels to tens of centimeters for more benign, low-turbulence channels. Similar to the turbulence effects, the aerosol effects can be modeled as a low pass spatial filter with an MTF determined by the particle sizes along the atmospheric channel 16. The particles along the channel 16 become denser as the visibility conditions worsen. For example, heavy fog implies lots of particles. The aerosols cause the light to be scattered and absorbed during propagation through the atmospheric channel 16, the net effect is image blur, loss of contrast, and additive noise.

From Fourier optical theory, the averaged long-exposure total atmospheric MTF is the multiplicative product of several individual and independent MTFs: such as the detector pixel MTF, the optical system (lens) MTF, the aerosol MTF, and the long-exposure turbulence MTF. The total atmospheric MTF may then be given by:

$$MTF_{total}(\omega_s,\lambda,D,z,\theta) = MTF_{pixel}(\omega_s)MTF_{lens}(\omega_s,\lambda,D)$$
$$MMTF_{aerosol}(\omega_s,\lambda,z)MTF_{turb\_LE}(\omega_s,\lambda,\theta) \quad (2)$$

For embodiments of the image capture device 14 that are based on charge-coupled device (CCD) or complimentary-metal-oxides-semiconductor (CMOS) sensors, individual pixel element dimensions $L_{det}$ (assuming square pixels) along with the imaging lens focal length f define a limit to the detectable spatial frequencies, denoted as the detector angular-spatial cutoff frequency $\omega_{c\_det}=f/L_{det}=1/\theta_{IFOV}$ where $\theta_{IFOV}$ is the instantaneous field-of-view (IFOV) of a single detector element (pixel). Using these terms the detector pixel MTF can be defined by:

$$MTF_{pixel}(\omega_s) = \begin{cases} \dfrac{\sin(\pi\omega_s\theta_{IFOV})}{(\pi\omega_s\theta_{IFOV})} & |\omega_s| \le \omega_{c\_det} \\ 0 & |\omega_s| > \omega_{c\_det} \end{cases} \quad (3)$$

The primary imaging lens aperture of the image capture device 14 also defines the diffraction-limited resolution, which is the best achievable imaging under otherwise perfect conditions (e.g., no turbulence, aerosol, or degradations due to optical aberrations). The diffraction-limited imaging resolution for a circular aperture is given by:

$$MTF_{lens}(\omega_s, \lambda, D) = \qquad (4)$$
$$\begin{cases} \dfrac{2}{\pi}\left\{\cos^{-1}\left(\dfrac{\lambda\omega_s}{D}\right) - \left(\dfrac{\lambda\omega_s}{D}\right)\left[1 - \left(\dfrac{\lambda\omega_s}{D}\right)^2\right]^{1/2}\right\} & \lambda\omega_s \le D \\ 0 & \lambda\omega_s > D \end{cases}$$

Aerosol absorption and scattering effects may be modeled as follows:

$$MTF_{aerosol}(\omega_s, \lambda, z) = \begin{cases} \exp(-A_a(\lambda)z - S_a(\lambda)z(\omega_s/\omega_c)^2) & \omega_s < \omega_c \\ \exp(-(A_a(\lambda) - S_a(\lambda))z) & \omega_s > \omega_c \end{cases} \quad (5)$$

where $\omega_c = a/\lambda$ is the angular-spatial cutoff-frequency, with a being the particulate radius, z is the path length, $A_a(\lambda)$ and $S_a(\lambda)$ the wavelength-dependent atmospheric absorption and scattering coefficients, respectively. One may define an atmospheric extinction coefficient $\beta$, which has units m$^{-1}$. Extinction is the sum of the absorption and scattering effects.

$$\beta_a(\lambda) = A_a(\lambda) + S_a(\lambda) \quad (6)$$

The long-exposure turbulence MTF may be given by the following equation:

$$MTF_{turb\_LE}(\omega_s, \lambda, \theta) = \exp\left[-3.44\left(\dfrac{\omega_s\lambda}{r_0}\right)^{5/3}\right] \quad (7)$$

where $r_0$ is the Fried atmospheric coherence radius parameter. The Fried atmospheric coherence radius parameter is a path-averaged quantity, which may be given (for plane waves) by:

$$r_0 = \left[0.42k^2\sec\varsigma\int_{h_0}^{H}C_n^2(z)\,dz\right]^{-3/5} \quad (8)$$

where $k=2\pi/\lambda$ is the wavenumber and $\varsigma$ is the slant-path angle from the zenith, in radians. There is mature and extensive fundamental theory describing the process and physics underlying various individual MTF components, which may be drawn upon in selecting the specific analytical models employed on the right-hand side of Eq. (2).

Image quality is a measure that can be defined as the perceived degradation of an image. IQMs are used to provide an objective quantitative rate or score of the quality of an image based on a number of factors. These factors can include, but are not limited to: sharpness, noise, contrast, distortion, blur, and many others. IQMs can be broken down into two primary categories: full-reference (FR) and no-reference (NR). FR IQMs score an image based upon knowledge of the un-degraded source reference image. NR IQMs score an image without any prior knowledge of the original un-degraded image. FR IQMs are more common and reliable, yet in practical applications a prior source reference image is typically unavailable so NR IQM techniques may be used.

Figure 3:
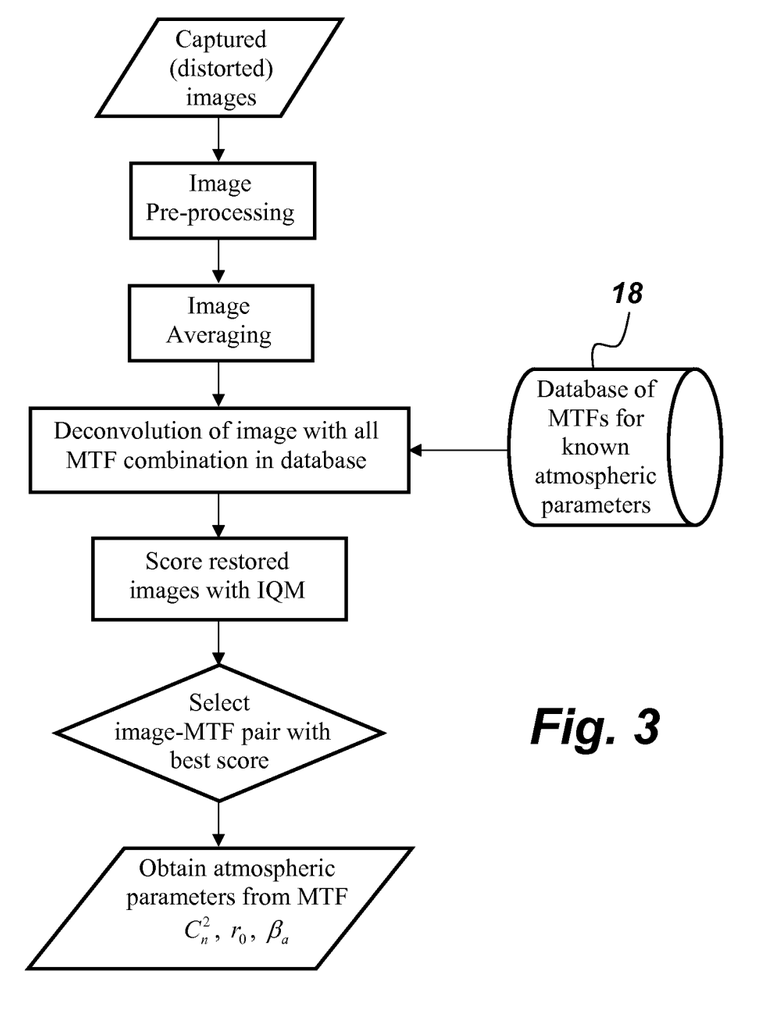
FIG. 3 is a flowchart of an embodiment of an atmospheric channel characterization method.

FIG. 3 is a flowchart of an embodiment of the atmospheric channel characterization method 10. In this embodiment of method 10, the first step provides for populating a database 18 with atmospheric turbulence and aerosol MTFs using known turbulence and aerosol values over realistic practical ranges based on range values from industry literature, measurements from atmospheric instruments, and/or known climatology models. The next step provides for capturing a series of images of the object 12 along the atmospheric channel 16 to be characterized. The next step provides for optionally performing preliminary image pre-processing, such as: adjusting for image movement; adjusting for image brightness; adjusting for any non-uniform illumination in image; adjusting image region of interest via cropping, and any other necessary/desired image enhancement and/or corrections. The next step provides for time-averaging of the series of images. The MTF theory used in this embodiment assumes the time-averaged image is representative of a long-exposure image. To implement this from the series of images captured, the images may be averaged over a time period that is faster than the Greenwood frequency and dependent upon the time constant of the atmosphere. The time constant of the atmosphere is typically related to the cross-wind along the atmospheric channel 16. In other words, the time period should be selected such that during the time period the atmosphere is quasi-stationary such that the atmospheric channel 16 is not subject to large changes that would affect the quality of the image such as a change in the lighting conditions. Examples of suitable ranges for the time period include, but are not limited to time periods lasting 100 milliseconds to 3 seconds. The next step provides for deconvolving the optionally-pre-processed, averaged, captured image with every MTF combination in the database 18. Then, for each deconvolved image, an IQM may be used to score the resulting image and store this value in a ranked table. Then, any optimization-decision algorithm may be used to find the best IQM score. In some cases, additional MTFs may be dynamically generated to further refine ambiguous cases such as when confidence thresholds from at least two different IQM scores overlap. For example, if the difference between two IQM scores falls within a predefined range additional MTFs may be dynamically generated over a finer parameter set to further distinguish between two the two scores. In the case of several results with close to the same score, an intelligent decision process based upon trends, meteorological inputs, and/or any other externally available information may be used to help resolve the ambiguity between the scores. Then, the best MTF match may be selected. The MTF set used to deconvolve the image which yields the best IQM score is selected as best characterizing the true conditions along the atmospheric propagation channel. Finally, the atmospheric parameters used to generate the best matching MTFs from the previous step are reported as describing the channel 16.

Atmospheric channel characterization method 10 may be used in scenarios where the object 12 has unknown characteristics prior to the image capture step. The image capture step may also be limited to passive image capturing where no active illumination of the object 12 or coherent reference lasers are used to capture the image of the object 12. In scenarios where the object 12 is a moving object, the method 10 may further comprise the step of optically tracking the object 12.

Figure 4A:
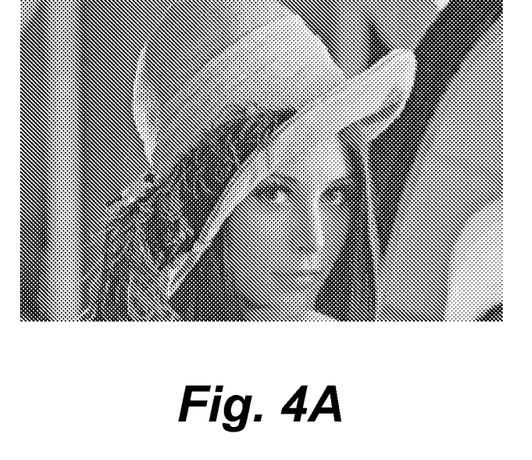
FIGS. 4A and 4B are source reference images.
Figure 4B:
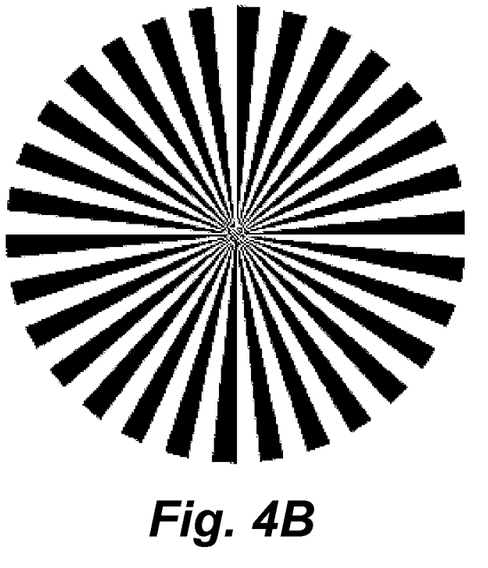

The following section describes designs, procedures, and analysis of results of passive imaging simulations and field-measured data according to an embodiment of the atmospheric channel characterization method 10. The first set of simulations involved a simplified scenario of just a diffraction-limited imaging system MTF and an atmospheric turbulence MTF. Two source reference images were used, the famous "Lena" reference image (FIG. 4A), and a high-resolution Siemens Star target (FIG. 4B). The Lena image (i.e., FIG. 4A) is a more representative natural image while the Siemens star target (i.e., FIG. 4B) has extremes of periodicity and contrast and geometrical structure. The performance of the IQMs against these different image types and characteristics is illustrated hereafter. The simulation scenario modeled a 500 m horizontal path, with an imaging lens aperture of 200 mm and lens focal length of 500 mm, with a 5 mm rectangular sensor size, and thus a 10 mrad full-angle field of view at a wavelength of 633 nm. Each source image (FIG. 4A and FIG. 4B) was blurred using the imaging system diffraction-limited MTF and one of a set of six turbulence MTFs of various $C_n^2$ values ranging from $5 \cdot 10^{-13}$ (very strong turbulence) down to $1 \cdot 10^{-15}$ (weak turbulence), resulting in a set of six blurred images for each source image.

Figure 5A:
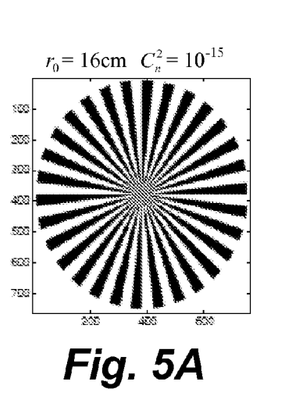
FIGS. 5A through 5C are examples of blurred images of a Siemens star target at different atmospheric turbulence conditions.
Figure 5B:
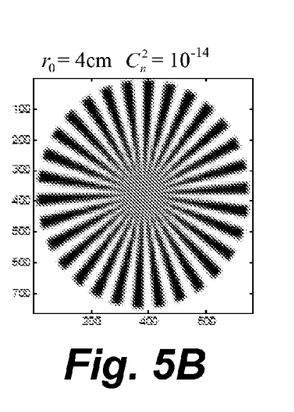
Figure 5C:
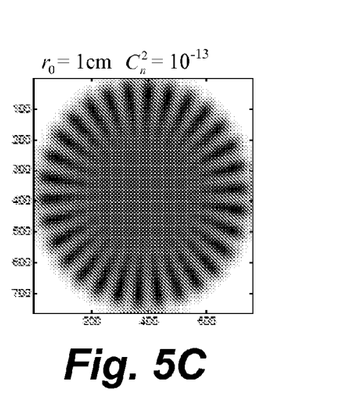
Figure 5D:
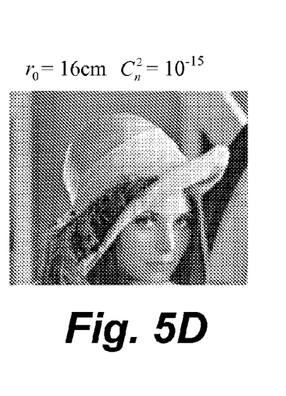
FIGS. 5D through 5F are examples of blurred natural images at different atmospheric turbulence conditions.
Figure 5E:
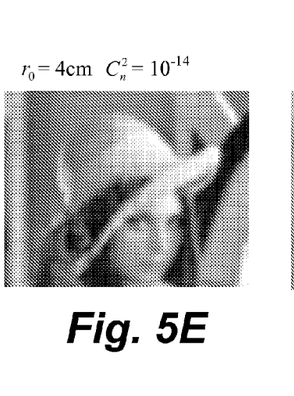
Figure 5F:
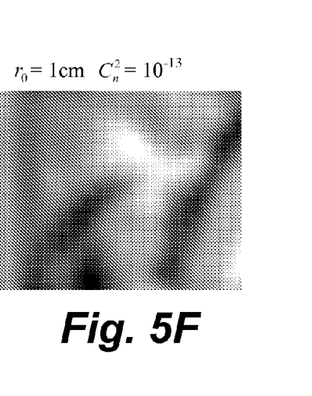

FIGS. 5A through 5C are examples of the resulting blurred images from the Siemens star target of three of the six $C_n^2$ values. FIGS. 5D through 5F are examples of the resulting blurred images from FIG. 4A of three of the six $C_n^2$ values. In both cases, the low turbulence blur MTF ($C_n^2=10^{-15}$) shows minimal blurring while the high turbulence blur MTF ($C_n^2=10^{-13}$) shows both significant decrease in edge sharpness and loss of contrast. Next, according to the atmospheric channel characterization method 10, each blurred image was deconvolved ("restored") using a Wiener filter algorithm using each of the six turbulence MTFs, resulting in six deconvolved images for each blurred image (giving a total of thirty six deconvolved images). Next, each of the six deconvolved images for a given blurred source image was input into four IQMs, and a quality score was obtained from each IQM. In this embodiment, two FR IQMs and two NR IQMs were used in the image analysis algorithm simulations and data processing steps. One of the FR IQMs used was the mean squared error (MSE), such as is disclosed in Wang, Z. and Bovik, A. C., "Mean Squared Error: Love It or Leave It?," IEEE Signal Processing Magazine, 98, (2009). The other FR IQM used in this embodiment was the structural similarity (SSIM), such as is disclosed in Wang, Z., Bovik, A. C., Sheikh, H. R., and Simoncelli, E. P., "Image quality assessment: From error visibility to structured similarity," IEEE Trans. Image Processing, 13, pp. 600-612, (2004). One of the NR IQMs used was the naturalness image quality evaluator (NIQE), such as is disclosed in Mittal, A., Soundararajan, R. and Bovik, A. C., "Making a Completely Blind Image Quality Analyzer," IEEE Signal Processing, (2013). The other NR IQM used in this embodiment was the MetricQ, such as is described by Zhu, X. and Milanfar, P., "Automatic Parameter Selection for Denoising Algorithms Using a No-Reference Measure of Image Content," IEEE Trans. on Image Processing, 19(12), (2010). It was then determined which deconvolved image had the highest score, and determined if the corresponding turbulence MTF used for deconvolution was the same MTF originally used to blur the image.

FIGS. 6A-6F show the six deconvolved "restored" images for the Siemens star target image that was originally blurred using the turbulence MTF with $C_n^2=10^{-13}$, a quite high level of turbulence intensity (see FIG. 5C). FIGS. 6A-6F were restored with the six turbulence MTFs with the following respective values: (A) $C_n^2=1$ e-15, (B) $C_n^2=5$e-15, (C) $C_n^2=1$ e-14, (D) $C_n^2=5$e-14, (E) $C_n^2=1$e-13, and (F) $C_n^2=5$e-13. The subjectively "best" restored image is FIG. 6E, which was deconvolved with the original "true" MTF.

Figure 6A:
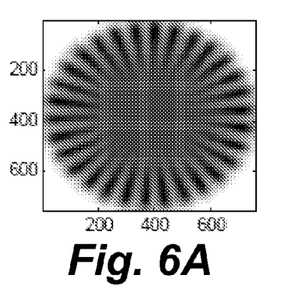
FIGS. 6A-6F show six deconvolved, "restored" images that were previously blurred.
Figure 6B:
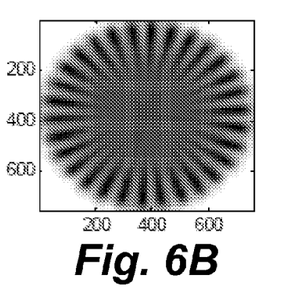
Figure 6C:
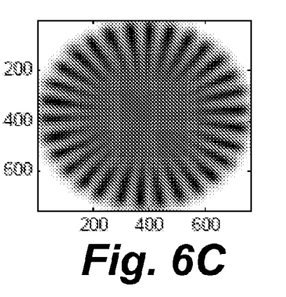
Figure 6D:
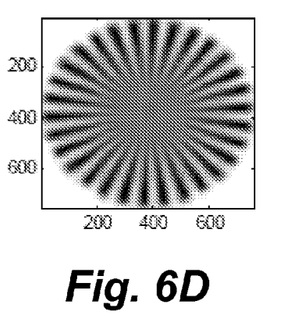
Figure 6E:
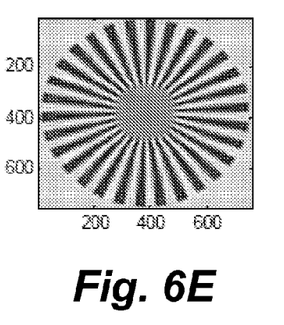
Figure 6F:
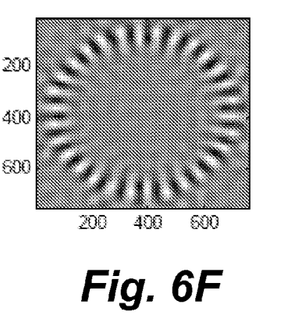
Figure 7A:
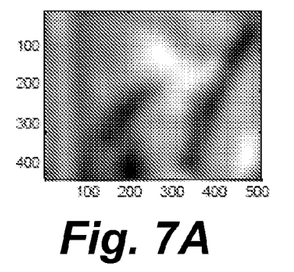
FIGS. 7A-7F show six deconvolved, "restored" natural images that were previously blurred.
Figure 7B:
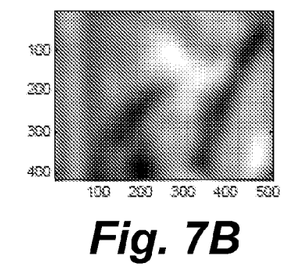
Figure 7C:
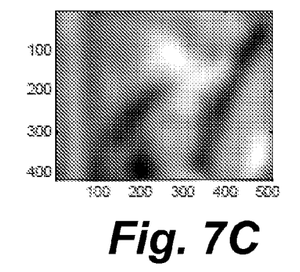
Figure 7D:
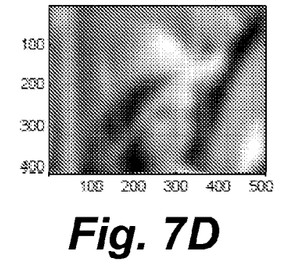
Figure 7E:
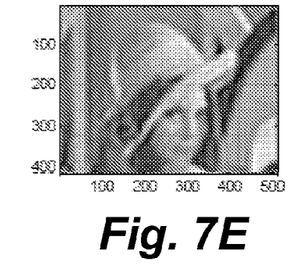
Figure 7F:
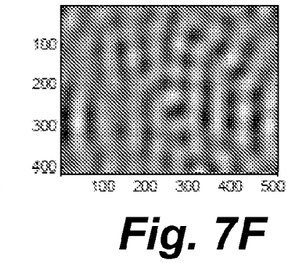

FIGS. 7A-7F show the six deconvolved "restored" images for the Lena image that was originally blurred using the turbulence MTF with $C_n^2=10^{-13}$ (see FIG. 5F). FIGS. 7A-7F were restored with the six turbulence MTFs with the following respective values: (A) $C_n^2=1$ e-15, (B) $C_n^2=5$e-15, (C) $C_n^2=1$ e-14, (D) $C_n^2=5$e-14, (E) $C_n^2=1$ e-13, and (F) $C_n^2=5$e-13. The subjectively "best" restored image is FIG. 7E, which was deconvolved with the original "true" MTF. One can see that subjectively in both cases, for the Siemens star target and the Lena images, the restored images shown in FIGS. 6E and 7E are the best (sharpest edges, least blurry, best contrast) images relative to their respective sets. As discussed below, the IQMs were able to correctly identify this image by assigning it the highest quality score in almost all cases, for both the FR and NR IQMs.

Table 1 shows the results of the turbulence MTF simulations described above. The notation convention used in the table for the result column headings is (x, y)=(image #, $C_n^2$, value), where image #1=Lena, and image #2=Siemens-star target, and y is an index into the refractive-index structure parameter vector={1e-15, 5e-15, 1e-14, 5e-14, 1e-13, 5e-13}, and "+" indicates a successful identification of the true MTF used to blur the image and "−" indicates failure to do so. We can see that the MetricQ (NR) IQM struggled with the natural Lena image but worked perfectly for the Siemens-star target, while the NIQE (NR) IQM worked perfectly for the natural Lena image but slightly underperformed MetricQ for the Siemens-star target. Thus it appears that each IQM has strengths and weaknesses in terms of the nature and character of the images which it analyzes.

TABLE 1

| IQM | 1,1 | 1,2 | 1,3 | 1,4 | 1,5 | 1,6 | 2,1 | 2,2 | 2,3 | 2,4 | 2,5 | 2,6 |
|---|---|---|---|---|---|---|---|---|---|---|---|---|
| MSE (FR) | + | + | + | + | + | + | + | + | + | + | + | + |
| SSIM (FR) | + | + | + | + | − | + | + | + | + | + | + | + |
| NIQE (NR) | + | + | + | + | + | + | − | + | + | + | + | + |
| MetricQ (NR) | − | − | − | − | − | + | + | + | + | + | + | + |

Figure 8A:
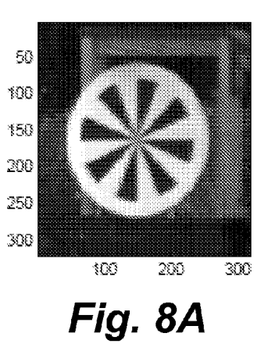
FIGS. 8A-8F are six, time-averaged images of the same object.
Figure 8B:
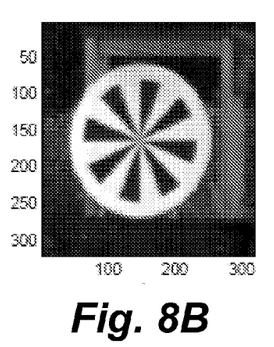
Figure 8C:
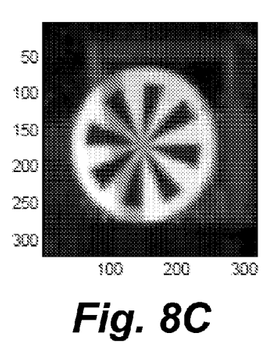
Figure 8D:
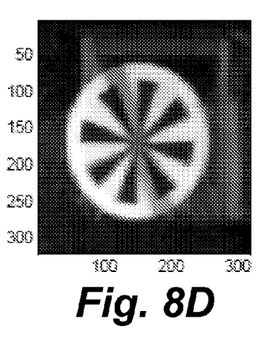
Figure 8E:
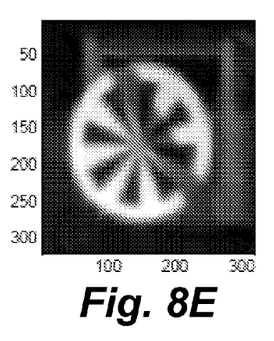
Figure 8F:
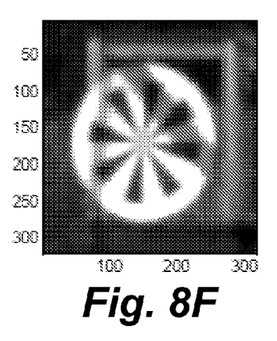
Figure 9A:
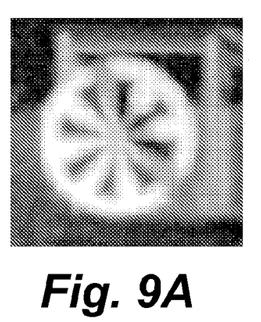
FIGS. 9A-9F show six restored images of FIG. 8F.
Figure 9B:
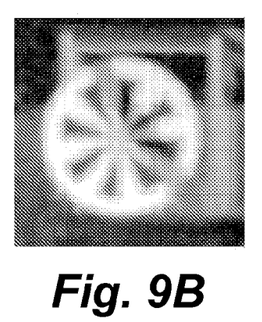
Figure 9C:
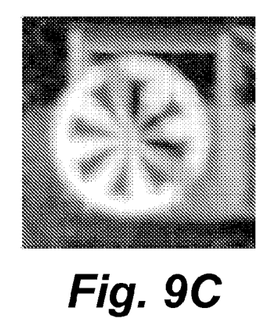
Figure 9D:
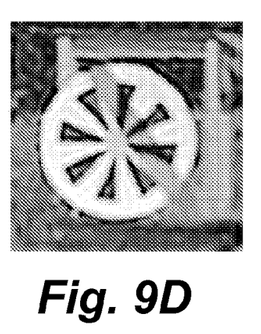
Figure 9E:
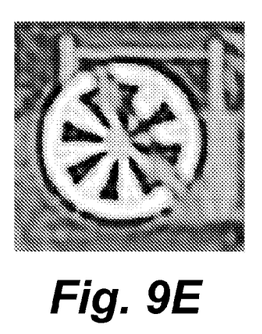
Figure 9F:
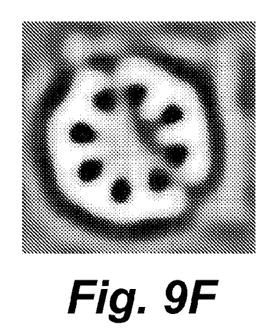

FIGS. 8A-8F are six, time-averaged images of the same experimental object 12. The six, time-averaged images were passively captured at various times of day and at various atmospheric turbulence levels along the same atmospheric channel 16. The atmospheric channel 16 was a coastal, horizontal optical path 381 meters long. The object 12, in this embodiment, was a 1 meter Siemens-star target, which was imaged using the image capture device 14, which in this embodiment was a basic refractor telescope with 600 mm focal length and 100 m aperture, F/#=F/6 and a Prosilica GC660 CCD camera with a 660 nm optical bandpass filter. The camera was set at Gain=0. For each capture, a sequence of ten images at 5 ms exposure times were taken. The ten images were averaged together to yield a single, long-exposure, averaged image (e.g., FIGS. 8A-8F) which was analyzed with the long-exposure turbulence MTF (Eqn. 7). FIG. 8A is the time-averaged composite of a series of ten images taken at 7:57 am when the measured turbulence of the atmospheric channel 16 was $C_n^2 \cong 10^{-15}$. The turbulence was measured with a differential-image motion monitor (DIMM) turbulence sensor which was co-aligned along the atmospheric channel 16. FIG. 8B is the time-averaged composite of a series of ten images taken at 8:32 am when the measured turbulence of the atmospheric channel 16 was $C_n^2 \cong 10^{-15}$. FIG. 8C is the time-averaged composite of a series of ten images taken at 11:11 am when the measured turbulence of the atmospheric channel 16 was $C_n^2 \cong 10^{-14}$. FIG. 8D is the time-averaged composite of a series of ten images taken at 11:56 am when the measured turbulence of the atmospheric channel 16 was $C_n^2 \cong 10^{-14}$. FIG. 8E is the time-averaged composite of a series of ten images taken at 12:51 pm when the measured turbulence of the atmospheric channel 16 was $C_n^2 \cong 5 \cdot 10^{-14}$. FIG. 8F is the time-averaged composite of a series of ten images taken at 1:51 pm when the measured turbulence of the atmospheric channel 16 was $C_n^2 \cong 10^{-15}$.

The time-averaged images shown in FIGS. 8A-8F were processed as the input blurred images according to the atmospheric channel characterization method 10. In this case, the "true" blurring MTFs are not known, but are assumed to be reasonably well modeled by the long-exposure turbulence MTF (Eq. 7). Thus, as described in detail in the simulations section above, each input blurred image was deconvolved using the set of six turbulence MTFs, and processed through four IQMs to receive quality scores. However, it is to be understood that the atmospheric channel characterization method 10 is not limited to six turbulence MTFs and four IQMs, but rather any desired number of MTF and IQMs may be used. In this embodiment, the "best" restored image was selected according to the highest quality score, and the corresponding deconvolution MTF was assumed to best represent the actual atmospheric conditions at that time, thus we obtain the best estimate of the corresponding refractive-index structure parameter $C_n^2$ and the related Fried atmospheric coherence width $r_0$ which were used to generate that MTF. For the FR IQMs, the first image (FIG. 8A) was used as a "reference" image; since it was taken under very low turbulence conditions it represents nominally "ideal" imaging conditions. Table 2 shows the results of running the atmospheric channel characterization method 10 on the six, long-exposure, time-averaged Siemens star images.

TABLE 2

| IQM/Image | 1 | 2 | 3 | 4 | 5 | 6 |
|---|---|---|---|---|---|---|
| MSE (FR) | 1 | 2 | 1 | 1 | 1 | 1 |
| SSIM (FR) | 2 | 2 | 2 | 1 | 1 | 1 |
| NIQE (NR) | 6 | 2 | 3 | 5 | 5 | 6 |
| MetricQ (NR) | 2 | 2 | 1 | 1 | 1 | 1 |

FIGS. 9A-9F show the restored image set for the sixth input blurred image (i.e., FIG. 8F). Table 2 shows that neither FR IQM was able to perform correctly in this embodiment. We suspect it is related to the use of one of the input blurred images as the reference image (we used the image in FIG. 8A for the results shown). Also, the NR MetricQ is seen to fail for all the higher turbulence images (e.g., FIGS. 8D-8F), which was not expected based on its performance in the simulation results, where it was seen to perform well on the Siemens-star target, but poorly on the natural Lena image. Perhaps the natural components and scenery in FIGS. 8A-8F can explain the poor performance of the MetricQ IQM. However, the NIQE NR IQM performs quite well, except for an anomalous failure on the first image. It appears to select the correct blurring MTF based on the DIMM-measured $C_n^2$ conditions when the images were captured, within a margin of error of +/− one MTF. Interestingly, the MTF it selects is not necessarily in line with what a human might subjectively select as the "best" image, as seen in FIGS. 9A-9F. To the human eye, FIG. 9D might appear clearer and more well-resolved, which corresponds to the MTF with $C_n^2=5 \cdot 10^{-14}$ while NIQE selected FIG. 9E corresponding to the MTF with $C_n^2= 1 \cdot 10^{-15}$.

From the above description of the atmospheric propagation channel characterization method 10, it is manifest that various techniques may be used for implementing the concepts of method 10 without departing from the scope of the claims. The described embodiments are to be considered in all respects as illustrative and not restrictive. The method disclosed herein may be practiced in the absence of any element/step that is not specifically claimed and/or disclosed herein. It should also be understood that method 10 is not limited to the particular embodiments described herein, but is capable of many embodiments without departing from the scope of the claims.

We claim:

1. A method for characterizing an atmospheric propagation channel comprising:
   generating a database of atmospheric modulation transfer functions (MTFs) over a range of known values for at least one image-quality-related parameter;
   capturing at least one image of an object with an image capture device, wherein the image capture device is separated from the object by the atmospheric channel;
   deconvolving the captured image with every atmospheric MTF in the database to create a plurality of deconvolved, captured images;
   scoring each deconvolved, captured image according to an image quality metric (IQM);
   using an optimization-decision algorithm to find the best IQM score; and
   characterizing the atmospheric propagation channel as possessing the type and value of the image-quality-related parameters that are associated with the corresponding MTFs used to deconvolve the image having the best IQM score.

2. The method of claim 1, wherein the captured image of the object has a time exposure range of approximately 100 ms to 500 ms.

3. The method of claim 2, wherein the at least one captured image is a time-averaged composite image from a series of images.

4. The method of claim 3, wherein the series of images are captured over a time period that is shorter than the time constant of the atmosphere.

5. The method of claim 1, wherein each atmospheric MTF comprises the product of an aerosol MTF and a turbulence MTF.

6. The method of claim 5, wherein each atmospheric MTF further comprises the product of the aerosol MTF, the turbulence MTF, a detector MTF, and an optical system MTF.

7. The method of claim 1, wherein prior to the image capture step, the object has unknown characteristics.

8. The method of claim 4, further comprising the step of preprocessing the captured image to enhance the captured image and/or to correct perceived errors in the captured image prior to the deconvolution step.

9. The method of claim 8, wherein in the preprocessing step is selected from the list of preprocessing techniques consisting of: adjusting for image movement; adjusting for image brightness; adjusting for any non-uniform illumination in the image; and adjusting image region-of-interest via cropping.

10. The method of claim 1, further comprising the step of dynamically generating additional MTFs over a finer parameter set to further distinguish between two IQM scores that are similar wherein the difference between their scores falls within a predefined range.

11. The method of claim 1, wherein in the case of two IQM scores that are close to each other such that the difference between their scores falls within a predefined range, ranking the two IQM scores based on trends and/or meteorological inputs.

12. The method of claim 1, wherein each deconvolved, captured image is scored according to a plurality of no-reference IQMs, and wherein the optimization-decision algorithm finds the best overall IQM score.

13. A method for characterizing optical parameters of an atmospheric propagation channel comprising the following steps:
   generating a database comprising a plurality of atmospheric condition scenarios according to a model based on known values of at least one image-quality-related parameter;
   passively capturing a digital image of an object, wherein the image is blurred and distorted due to atmospheric effects;
   correcting the image based on the atmospheric condition scenario in the database to produce a plurality of corrected images;
   scoring each corrected image according to a no-reference, image quality metric and identifying the corrected image with the best score; and
   characterizing the optical parameters of the atmospheric propagation channel as equal to the atmospheric condition scenario that corresponds to the best score.

14. The method of claim 13, wherein each atmospheric scenario is modeled based on a total atmospheric modulation transfer function (MTF) that is the multiplicative product of a plurality of individual parameter MTFs.

15. The method of claim 14, wherein each atmospheric MTF comprises the product of an aerosol MTF and a turbulence MTF.

16. The method of claim 15, wherein each atmospheric MTF further comprises the product of the aerosol MTF, the turbulence MTF, a detector MTF, and an optical system MTF.

17. The method of claim 14, wherein no active illumination of the object or coherent reference lasers are used to capture the image of the object.

18. The method of claim 14, wherein the object is a moving object and further comprising the step of optically tracking the object.

19. The method of claim 13, wherein the captured image is a time-averaged composite image from a series of images captured over a time period that is shorter than the time constant of the atmosphere.

20. The method of claim 19, wherein prior to the image capture step, the object has unknown characteristics.

* * * * *